Jan. 28, 1941.  H. M. CURRIE  2,230,197
FRUIT AND VEGETABLE DRIER
Filed May 21, 1938   2 Sheets-Sheet 1

Inventor
Harold M Currie
Arthur M Hahn
Attorney

Jan. 28, 1941.  H. M. CURRIE  2,230,197
FRUIT AND VEGETABLE DRIER
Filed May 21, 1938  2 Sheets-Sheet 2

Inventor
Harold M Currie
By Arthur M Hahn
Attorney

Patented Jan. 28, 1941

2,230,197

UNITED STATES PATENT OFFICE 2,230,197

FRUIT AND VEGETABLE DRIER

Harold Manning Currie, New Castle, Pa., assignor to Mathews Conveyer Company, Ellwood City, Pa., a corporation of Pennsylvania Application May 21, 1938, Serial No. 209,350

2 Claims. (Cl. 34—1)

This invention relates to drying apparatus and has particular reference to an apparatus for the drying of fruits and vegetables.

Modern merchandizing requires that fruits and vegetables offered for sale must be clean and attractive in appearance. As a consequence washing, cleansing and drying of the fruits and vegetables prior to their shipment or storage has been the accepted practice. This is particularly so with vegetables implanted in the ground. Before shipment, complete removal of clinging soil is necessary. This is usually accomplished by a washing operation which is followed by a drying operation. This invention is particularly concerned with the apparatus employed for the drying operation.

With the present methods of drying fruits and vegetables, considerable difficulty has been experienced in effectively drying the fruits and vegetables after their washing operation and prior to their packaging and shipment or storage. One method of drying, employs air blasts to blow off excess water from the surface of the vegetable. It has been found, however, that the use of air blasts for drying purposes tends to spread the surplus water over the surface of the potatoes or other articles without removing a sufficient amount of moisture to constitute successful drying. Another drying arrangement uses a system of circulated conditioned air to evaporate the water and moisture from the fruits and vegetables but such system is expensive and requires considerable apparatus. Other arrangements involve the use of some water absorbing medium which directly contacts the articles to be dried so as to absorb the water and moisture adhering to the outer surface of the articles. It is to this latter class of devices that the present invention is directed.

The apparatus for drying must operate continuously so as to provide sufficient capacity to handle daily, large quantities of the fruits or vegetables to be dried. Furthermore the drying operation must be so efficient in its removal of moisture from the fruits and vegetables as to prevent future decay or freezing in the packaging or storing of such foodstuffs.

It is a primary object of the present invention to provide an improved form of drying apparatus which is capable of continuous operation so as to handle large quantities of fruits and vegetables to be dried, and which is effective to dry such foodstuffs so that they are ready for proper packaging, shipment or storage.

A further object of the invention is the provision of an endless conveyer for the purpose of conveying and drying the fruits and vegetables, such drying function being accomplished by the absorbent characteristic of the conveyer material in its contact with the fruits and vegetables that are supported and conveyed thereby. The invention further contemplates the provision of apparatus for rotating and manipulating the fruits and vegetables during their conveyance so as to present all surfaces thereof for direct contact with the absorbent conveyer. In this manner the articles handled are effectively dried over their entire surfaces.

Another object of the invention is the provision of auxiliary flexible absorbent drying surfaces for direct contact with the articles being conveyed. This is in addition to the absorbent conveyer so as to aid in the removal of moisture from the surface of the articles being conveyed by the drying apparatus.

A further object of the invention is to provide a novel belt tensioning apparatus acting directly upon the run of the absorbent drying conveyer. This belt tensioning apparatus will automatically take up the slack in the endless drier belt conveyer so that the conveying surface thereof will be maintained as a substantially plane surface.

A still further object of the invention is to provide mechanism for the removal of the absorbed water and moisture from the absorbent conveyer belt, so that upon continuous presentation of the absorbent belt surface to other articles to be dried, a more effective removal of the water and moisture therefrom is obtained.

Another object of the invention is the provision of belt aligning mechanism which is effective to prevent side creeping of the absorbent endless conveyer belt. Such defect, if not corrected, will cause wear of the conveyer belt along its edge as it contacts with the conveyer frame guide structure due to misalignment.

With the foregoing and other objects, which will become apparent as the description proceeds, the invention may be said to consist in the various novel features of construction and arrangement or combination of parts, all of which will be fully described hereinafter and pointed out in the appended claims.

In the drawings accompanying and forming a part of this application,

Figure 5 is a plan view of the belt tensioning apparatus; and

Figure 6 is a transverse sectional view taken through one of the kicker rolls provided with the drying apparatus.

Figure 1:
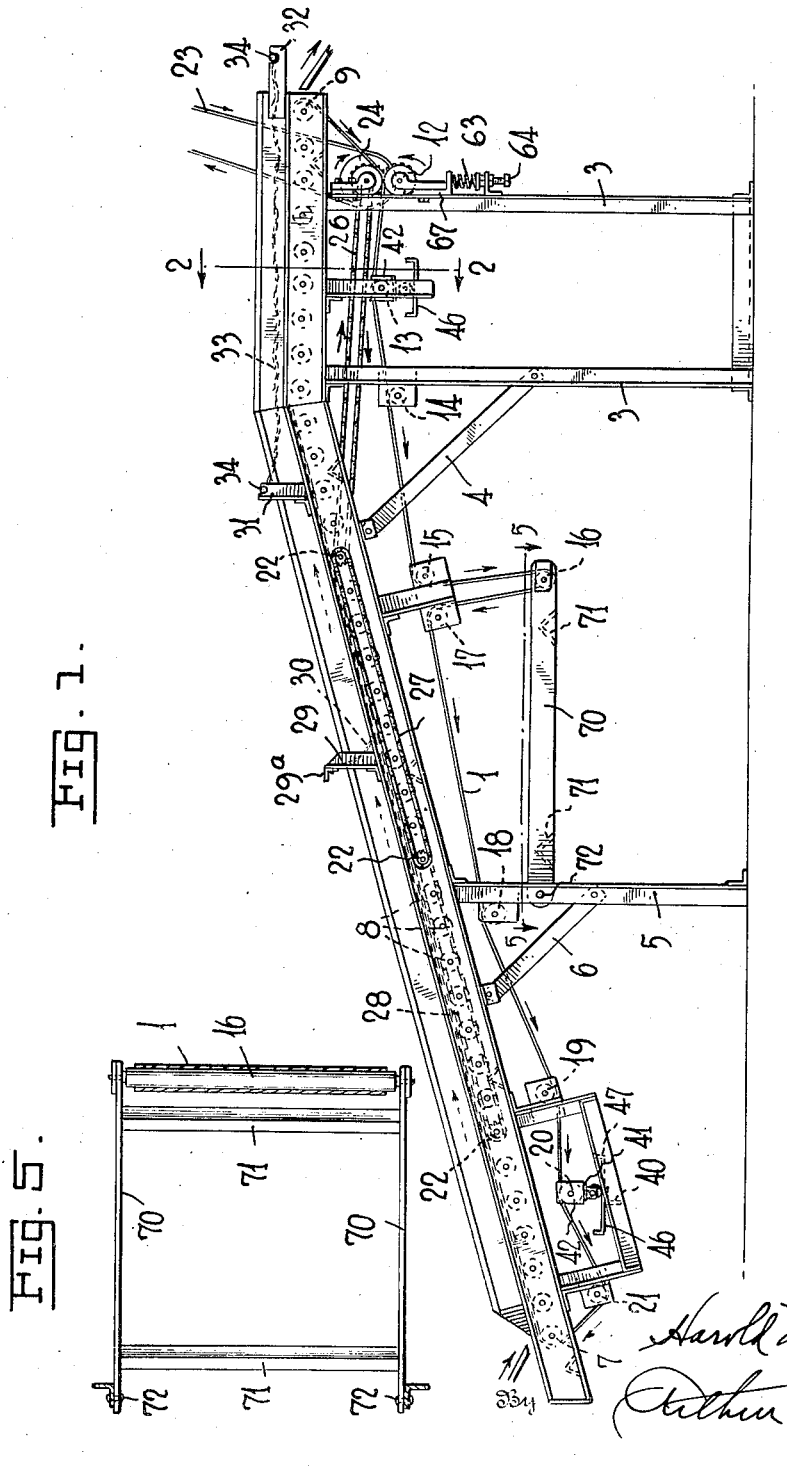
Figure 1 is a side elevation of a drying apparatus constructed in accordance with my invention.

Referring to Figure 1, my improved drying apparatus comprises an endless conveyer belt 1 which is made of an absorbent fabric or similar material. The absorbent conveyer belt 1 is mounted within a conveyer frame constructed from channel bars 2. As shown in Figure 1, the major portion of the conveyer frame 2 is inclined to the horizontal at approximately an angle of 15 degrees, although the right hand end of the conveyer frame structure preferably terminates in a horizontal portion. The conveyer frame 2 is supported in any approved manner, as by means of a framework comprising the upright angle bars 3 and 5. Bracing struts 4 and 6 connect the inclined portion of the conveyer frame structure 2 with the respective upright angle bars 3 and 5.

The absorbent endless conveyer belt 1 is mounted upon the conveyer frame 2 and the supporting structure therefor as follows: from the lower left hand end of the conveyer frame 2 the belt 1 engages about an idler roll 7, continues along the upper run of the conveyer frame 2 over similar idler supporting rollers 8 and a plurality of spaced kicker rollers 22, engages about an end roller 9 at the right hand end of the conveyer frame 2, then starts its return run between a pair of pressure or wringer rolls 11, 12, and continues over a plurality of idler rollers 13, 14, 15, 16, 17, 18, 19, 20, 21, thus completing the return run of the belt to the initial idler roller 7.

Figure 2:
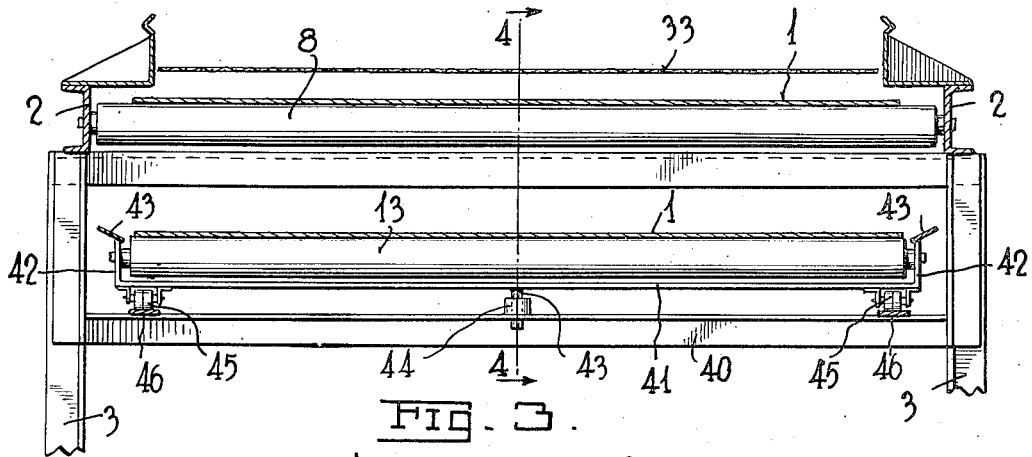
Figure 2 is a vertical sectional view taken on the line 2—2 of Figure 1.

As illustrated in Figures 1 and 2, the upper run of the conveyer 1 is supported on the conveyer frame 2 by the idler rollers 8 and the kicker rollers 22. The idler rollers 8 are freely mounted for rotation between the side walls of the conveyer frame 2. The rollers 8 are uniformly spaced so as to form a non-frictional support for the upper run of the drier conveyer 1. The potatoes or other articles to be dried are conveyed by the supported upper run of the drier conveyer 1, and during such conveyance they come into direct contact with the absorbent surface of the conveyer belt 1 so that the water or moisture on the contacted surfaces of the potatoes or other articles will be removed therefrom.

In order to positively insure that the potatoes or other articles will be turned and rotated during their conveyance so as to present their wetted surfaces for direct contact with absorbent conveyer 1, there is provided a plurality of positively driven kicker rollers 22 in the conveyer frame 2. As shown in Figure 1, there are three such kicker rollers 22 illustrated, but it is obvious that any desired number can be used. Each of the kicker rollers 22 has an extended shaft with a drive sprocket attached thereto. These sprockets are interconnected and driven by means of sprocket chains 26, 27 and 28; the sprocket chain 26 being driven from the sprocket 25 (Figure 3) which is fastened to the extended shaft of the wringer roll 11. Also fastened to the extended shaft 7 of the wringer roll 11 is a drive pulley 24, which is driven by a drive belt 23 that may be connected to any suitable source of power, not shown.

The cross-sectional view in Figure 6 shows the shape of the kicker rollers 22. Diametrically opposed surfaces of these kicker rollers are provided with projections in the form of longitudinally disposed ribs 22'. These ribs may be semi-circular in cross-section and formed from suitably shaped steel bars which are welded to the outer surface of the rollers 22. The number of ribs 22' for each roller 22 is a matter of choice depending upon the requirements of the particular case. The function of the positively driven kicker rollers 22 is to kick, rotate and agitate the potatoes as they ride upon the absorbent conveyer belt 1. This action will prevent bunching of the potatoes upon the conveyer belt and also present different wetted surfaces of the potatoes to the absorbent surface of the conveyer belt 1.

The potatoes conveyed on the absorbent belt 1 are further agitated in their movement on the belt by the inclination of the conveyer frame 2. This inclination causes the potatoes, as they travel on the absorbent belt over the idler rollers 8 and kicker rollers 22, to roll backwardly by gravity to some extent relative to the forward movement of the conveyer. This continual movement of the potatoes presents different surfaces thereof for direct contact with the absobent surface of the endless conveyer 1.

Intermediate the ends of the inclined portion of the conveyer frame 2, there is fastened a frame consisting of uprights 29 and a transverse angle member 29a which supports a transversely arranged flexible fabric flap 30. This flap is attached to the bar 29a and depends therefrom so that the lower edge of the flap is free to engage the upper surfaces of the potatoes travelling up the conveyer 1 and thereby effect a wiping action on the potatoes.

Mounted on the conveyer frame 2, preferably above the horizontal portion thereof is a flexible absorbent fabric 33. The end marginal edges of the fabric are attached to rods 34 which are received in notches formed in longitudinally spaced supporting brackets 31, 32. These brackets are attached to the conveyer frame 2 so as to support the fabric 33 above the horizontal portion of the travelling conveyer 1 and in contact with the potatoes travelling on the conveyer belt, and thus effect a further wiping and drying thereof. Furthermore, engagement of the fabric 33 with the potatoes acts as a retarder to the travel of the potatoes with the result that the potatoes are caused to rotate upon the conveyer belt 1 and effect further drying. The absorbent fabric 33 is readily removable from its supporting brackets 31, 32. When it has become too wet with absorbed moisture from the potatoes, it is replaced by a similar dried fabric 33.

Figure 3:
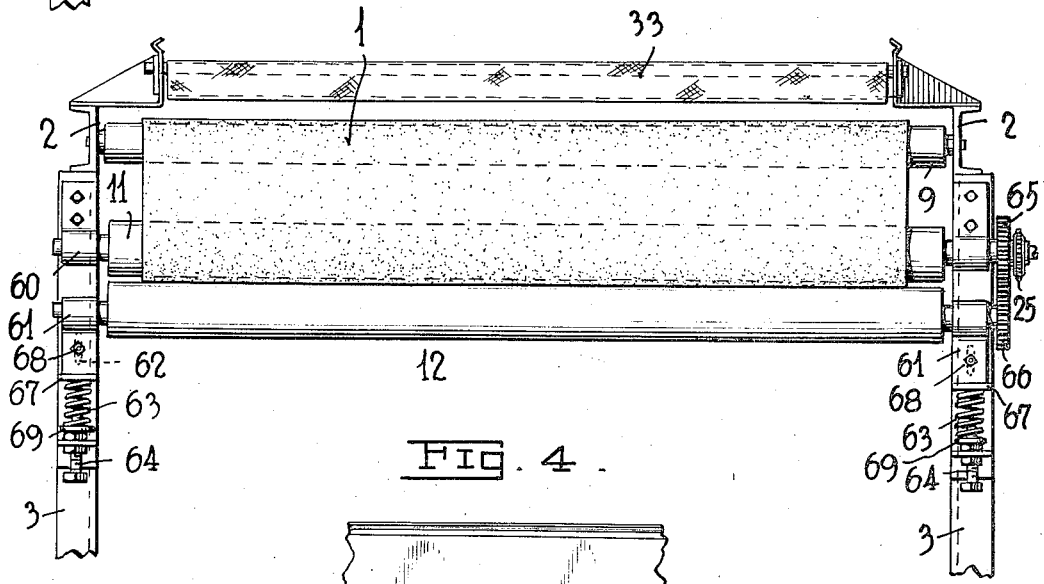
Figure 3 is a fragmentary end elevation of the drying apparatus illustrated in Figure 1 looking from the right.

Referring to Figures 1 and 3, the drive for the absorbent endless belt conveyer 1 comprises a pair of pressure rolls 11 and 12, between which, the endless conveyer 1 is fed. These rolls are preferably rubber covered and one of the rolls is spring pressed toward the other so as to not only frictionally engage and drive the endless belt conveyer 1, but also to wring the water therefrom. As illustrated in Figure 3, the upper pressure roll 11 is journalled in dead eyes 60, which are mounted on the angle uprights 3 of the frame structure. The lower roll 12 is journalled in dead eyes 61 which are mounted for vertical adjustment relative to the adjacent dead eyes 60. The dead eyes 61 are carried by suitable angle supports 67 each of which is fastened to the frame member 3 by a bolt 68 engaged through a slot 62 to permit vertical movement thereof. A compression spring 63 engages beneath the horizontal portion of each angle support 67 to urge the lower roll 12 in spring pressed engagement with the endless belt 1 and the upper roll 11. Each of the pressure rolls 11 and 12 is positively driven by means of inter-engaging deep toothed gears 65 and 66 which provide for proper engagement even though there may be a relative vertical displacement between the pressure rolls 11 and 12. The gear 66 is keyed to the shaft of roll 12, and the gear 65 is keyed to the shaft of roll 11. The shaft of the roll 11 is driven by the pulley 24 and belt 23. A secondary and important function of the pressure rolls 11 and 12 is their action as wringer rolls for compressing the absorbent endless belt 1 as it is fed therebetween, and removing the water and moisture absorbed thereby during the operation of drying the fruits or vegetables conveyed thereon. The endless conveyer belt 1 in passing between the pressure rolls 11 and 12, is wrung substantially dry and is then in condition to receive and dry other fruits and vegetables.

As shown in Figure 3, each spring 63 also engages a stop member 69 which latter is adjustable by means of a set screw 64 in order to adjust the force of the spring and to thus adjust the compression force on the belt 1 created by the rolls 11 and 12.

Figure 4:
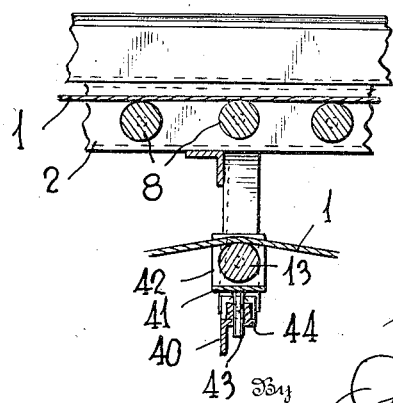
Figure 4 is a fragmentary vertical sectional view taken on the line 4—4 of Figure 2.

In order to keep the lower run of the endless belt conveyer in proper alignment on its idler rollers, I have employed a novel belt aligning mechanism, as particularly shown in Figures 1, 2 and 4. To prevent side creeping of belt 1 as it passes over the roller 13, the latter is rotatably mounted in a frame 41 which has vertical side portions 42 and flared guide portions 43. Centrally located on the base of the frame 41 and integrally attached thereto is a pin 43 which is journalled in a bearing 44 carried by transverse frame member 40. The outer ends of the frame 41 are supported by rollers 45 upon suitable trackways 46. The extremities of these trackways are bent upwardly to provide stops to limit swinging movement of the roller frame 41. It will thus be apparent that the roller supporting frame 41 is capable of limited swinging movement in a horizontal plane about the vertical axis of pin 43. Assuming that the belt is properly centered during its movement upon the idler roller 13, there will be no swinging movement of the frame 41, and the latter will remain in its normal position as indicated in Figures 1, 2 and 4. However, if for example, the belt 1 should creep, for any reason, toward the right side of roller 13 as viewed in Figure 2, the supporting frame 41 would swing about the vertical axis of the pin 43 so as to bring the right side of the frame 41 slightly forward and the left side of the frame 41 correspondingly backward. This movement of the frame would skew the position of the roller 13 so as to automatically guide the endless belt 1 to its central position on the roller 13. In the event that the endless belt 1 should side creep to the left side of roller 13, a similar but reverse movement would be effected. This self-alignment of the endless belt 1 upon the idler roller 13 is automatic in its action and will prevent wear upon the edges of the belt as might otherwise take place due to engagement with the flared guides 43. I have shown in Figure 1 a second such belt aligning mechanism located at the lower left end of the conveyer frame, corresponding numerals being used thereon to indicate similar parts as heretofore described.

Provision is made to apply a sufficient tension to the endless belt 1 to prevent undue slack in the same. The belt tensioning device is illustrated in Figures 1 and 5, and comprises a frame formed of side members 70 and transverse connecting angle irons 71. The right hand end of the frame as viewed in Figure 1, has journalled therein the idler roller 16. The left hand end of the frame is pivotally connected at 72 to the upright angle members 5. In operative position, the belt tensioning frame 70, 71 is freely and pivotally supported on the pivots 72 by means of the U-shaped run of the endless belt 1 about the closely spaced idler rollers 15 and 17, and the frame idler roller 16 which is positioned below said two closely spaced rollers.

The endless belt 1, as shown in Figure 1, is unloaded and said belt forms a substantially plane surface in its run over the supporting idler rollers 8. The upper run of the drier conveyer 1 is maintained as a plane surface by the belt tensioning device. Any tendency toward slack in the endless belt 1 is taken up by the weight of the roller 16 in its pivotal frame 70, 71.

The operation of the device is best understood by reference to Figure 1. Wet potatoes or other articles are fed in any suitable manner to the lower end of the inclined frame 2, and onto the absorbent endless belt conveyer 1. The wet potatoes are conveyed by the belt 1 over the idler rollers 8 and the kicker rollers 22. During their movement upwardly, the potatoes are rotated and moved about so as to continually present new surfaces for direct contact with the absorbent surface of the belt 1. The kicker rollers 22 strike against the lower surface of the upper run of the drier conveyer 1, thereby agitating the conveying surface to prevent bunching of the potatoes carried thereon. The flexible flap 30 aids in the drying of the potatoes in their movement up the endless belt 1. When the potatoes reach the horizontal run of the conveyer belt 1, they are further rotated, dried, and leveled off by the overhanging fabric 33. From the horizontal portion of the conveyer the dried potatoes are directed to a suitable discharge chute for further treatment or packing.

On the return run of the endless belt 1, the pressure rolls 11 and 12 squeeze the absorbed water therefrom, and at the same time provide the necessary drive for the conveyer belt. As heretofore described, the belt aligning devices 40—46 centrally retain the belt 1 upon the idler rollers 13 and 20. The belt tensioning frame 70, 71 eliminates any slack in the endless belt 1.

In actual use my device has demonstrated that wet potatoes entering upon the drying conveyer leave the same in a sufficiently dry condition so that they may be immediately packed for shipment or storage and that such drying operation may be carried on continuously.

It is of course understood that while I have referred to the various operations of my machine in connection with the handling and drying of potatoes, fruits, or other vegetables, my apparatus may be adapted equally well for use with other articles where the step of drying or a similar function is to be performed.

What I claim is:

1. In a drier of the character described, a conveyer including a substantially horizontal portion and an inclined portion forming a support for articles to be dried, an endless absorbent belt of which the upper run passes over said inclined and horizontal portions, said belt having a length substantially greater than the supporting portion over which it passes, a pair of transversely disposed and closely spaced idler rolls for guiding the return run of said belt, a take-up mechanism including a pair of pivotally mounted arms having a roller journalled therebetween and engaging the return run of said belt and below the idler rolls, said roller being arranged intermediate said spaced idler rolls whereby the return run of said belt is guided in a substantially vertically disposed U-shaped path to take up the slack in said belt and maintain the upper run of the belt on said support as substantially plane surfaces on the horizontal and inclined portions.

2. A drier of the character described comprising a conveyer including an inclined portion and a horizontal portion, an endless belt of absorbent material adapted to receive the articles to be dried on the upper run thereof, a plurality of longitudinally spaced and transversely arranged rollers beneath the inclined and horizontal portions of said belt, said rollers serving to support the upper run of said belt in substantially continuous flat surfaces, a combined wringer and drive mechanism for expressing moisture from the return run of said belt and actuating the same, means at each end of the conveyer acting on the return run of said belt for automatically preventing the belt from creeping transversely to its direction of travel, and an automatic take-up mechanism including a pair of closely spaced idler rollers and a vertically movable take-up roller below the idler rollers through which the return run of said belt passes in a substantially U-shaped path after passage through said wringing and driving mechanism, and thereby maintaining the absorbent conveying surface of the same as a substantially plane surface.

HAROLD MANNING CURRIE.